Aug. 4, 1925.

G. H. ISLEY

REVERSING APPARATUS FOR HEATING FURNACES

Filed May 11, 1923   2 Sheets-Sheet 1

1,548,419

Inventor.
George H. Isley

Patented Aug. 4, 1925.

1,548,419

UNITED STATES PATENT OFFICE.

GEORGE H. ISLEY, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS.

REVERSING APPARATUS FOR HEATING FURNACES.

Application filed May 11, 1923. Serial No. 638,258.

*To all whom it may concern:*

Be it known that I, GEORGE H. ISLEY, a citizen of the United States, residing at Worcester, in the county of Worcester and Commonwealth of Massachusetts, have invented a new and useful Improvement in a Reversing Apparatus for Heating Furnaces, of which the following, together with the accompanying drawings, is a specification.

The present invention relates to improvements in apparatus which is used with regenerative furnaces for reversing the course through such a furnace of the burning gaseous fuel.

The invention relates particularly to that type of furnace reversing mechanism which employs swinging or shiftable valves, adapted to direct the air or gas supply to either end of the furnace, as desired, and simultaneously to connect the other end of the furnace with the stack. The invention resides in a novel and simplified arrangement of parts for this purpose, so organized as to obtain, at a great saving of space, the most direct and advantageous dispositions of the passages serving for gaseous flow, all as more fully set forth in the following detailed description, and shown in the accompanying drawings, wherein—

Like reference characters refer to like parts in the different figures.

Figure 1:
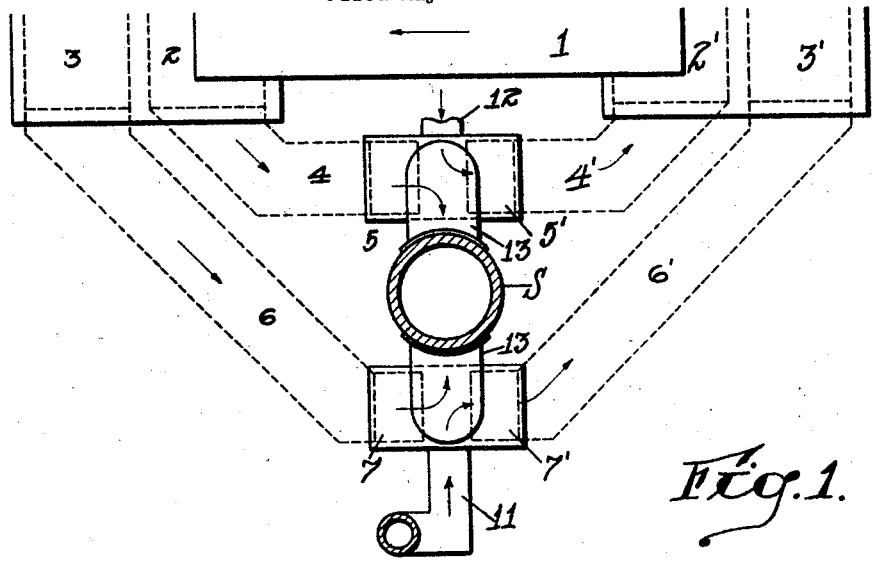
Fig. 1 is a diagrammatic plan view illustrating the adaptation of reversing apparatus, embodying the invention, to a regenerative furnace.

As shown in Fig. 1, the regenerative furnace is indicated diagrammatically at 1, and the usual air and gas regenerator passages at opposite ends of said furnace are indicated respectively at 2, 2' and 3, 3'. Each of these regenerator passages has its usual underground flue or conduit, the arrangement being such that the air flues 4, 4' provide associated ground level terminals 5, 5', while the gas flues 6, 6' provide associated ground level terminals 7, 7'.

Figure 2:
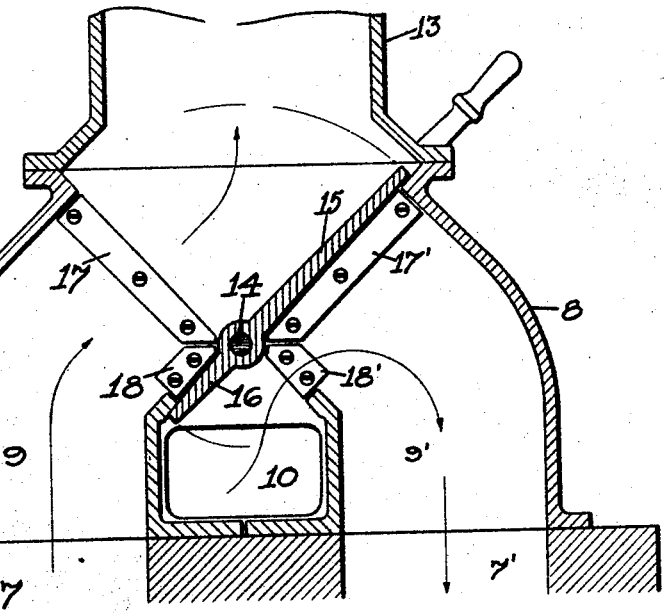
Fig. 2 is a longitudinal sectional view, on a larger scale, of one of the valve devices that may be used in Fig. 1.

In superposed relation to each set of terminals 5, 5' and 7, 7', is a reversing structure of the form shown in Fig. 2, the two reversing structures being identical, so that a description of one will suffice for both. Said structure embodies a stationary hood or casing 8, common to both of the associated flue terminals, here shown as the gas regenerator terminals 7 and 7', both opening into the space inclosed by said hood, which is so formed at the bottom as to provide independent passages 9 and 9', constituting extensions of said terminals. Intermediate of its connections to said flue terminals, the hood 8 has a supply channel 10, in this case communicating exteriorly of said hood with a gas supply conduit 11, and in the case of the air valve structure, opening, as will be understood, to the atmosphere, as shown at 12, Fig. 1. At the top, each hood 8 provides a stack connection 13 for the purpose of carrying off the waste gases that are delivered beneath the hood from one to the other of the flue terminals, as the case may be.

The control of gaseous flow within each hood 8 is effected by a swinging valve member which pivots about an axis 14 immediately above the supply channel 10. Said valve member thus provides an extended portion 15 of large area on one side of its axis and a shorter portion 16 of relatively small area on the other side of its axis, the former adapted to cooperate with one or the other of the seating ledges 17, 17', associated, respectively, with the extensions 9 and 9', and the latter adapted to cooperate with one or the other of the seating ledges 18, 18' surrounding, respectively, the left and right hand exits from channel 10. This eccentric mounting of the valve member, by which its portion 16 of smaller area is made effective on the supply channel 10, permits said supply channel 10 to be disposed wholly above the ground level. This is a distinct advantage over previous constructions, wherein similar supply channels were required to be placed below the ground level, making necessary the construction of a third underground flue, which obviously is eliminated by my construction. In the latter, the elimination of this third underground flue allows an appreciable narrowing of the space between the two underground flues 7, 7' (or 5, 5', as the case may be), and thereby the area occupied by the valve structure as a whole is considerably reduced, as is also the amount of metal required in the construction of said valve structure; furthermore, the passage of exhaust gases to the stack connection 13 from the flue terminals 7 or 7' is much less tortuous than in structures where similar flue terminals, due to the disposal between them of a third underground flue, are more widely separated.

In that position of the valve member shown in Fig. 2, the gas supply from channel 10 is directed past seat 18' into the right hand flue terminal 7', passing thence to the right hand side of the furnace by way of flue 6 and regenerator passage 3'. The products of combustion, which leave the furnace by way of regenerator passage 3 and its associated flue 6 on the left hand side, make exit to the stack S by way of flue terminal 7, hood passage 9 and stack connection 13, it being understood that the valve seat 17 being open, permits a full unobstructed flow through the left hand side of hood 8. It will also be understood that these conditions are duplicated in the other valve device, whose intermediate channel 10 is open to the atmosphere, the air entering the furnace on the right hand side by way of flue terminal 5', flue 4 and regenerator passage 2', and a portion of the products of combustion, passing out through the left hand regenerator passage 2 and its associated flue 4, make exit by way of the flue terminal 5 to the stack. When the two valve members are swung counterclockwise through approximately ninety degrees, so as to cooperate with the seat portions 17 and 18', thereby opening the seats 17' and 18, the flow through the furnace 1 is reversed, the air and gas entering on the left hand side, and the products of combustion passing out to the stack from the right hand side.

By virtue of this construction, the passage of exhaust gases to the stack is always maintained in the desired upward direction; furthermore, the provision of the supply channel for air or gas above the ground level, instead of below said level and between the underground regenerator flue terminals as in other valve devices of this type, greatly reduces the space or area that is occupied by the reversing apparatus, while at the same time establishing passages for gaseous flow of sufficient size for all requirements; the entering gas or air being relatively cold, needs no larger area of escape than that provided through the seats 18 or 18', while the large areas 17 and 17' involve no reduction of size whatsoever from the passages that serve for the conveyance of the hot expanded waste products from the furnace. These advantages, in connection with the eccentric disposition of the valve member, the latter being materially reduced in size as to that end which controls the entering gas or air, result in a structure of the utmost efficiency and economy, since the opportunity for leakage of the entering gases is reduced to a minimum, and the stack draft on the exhaust gases is exerted in a uniformly upward direction. Furthermore, the valve member, by reason of its eccentric mounting, maintains itself closed by gravity, in either position of operation, thus avoiding the necessity for the use and movement therewith of counterweights.

Figure 3:
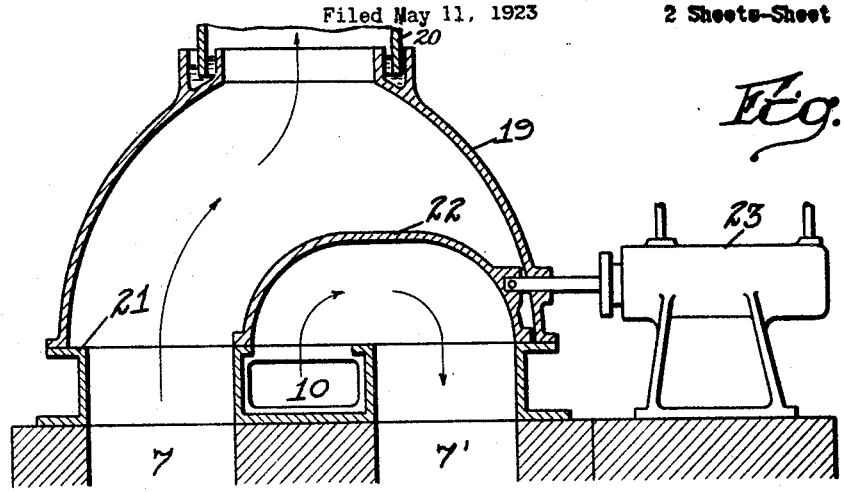
Figs. 3, 4 and 5 are views similar to Fig. 2, showing modified arrangements of the invention.

Substantially the same advantages as heretofore described are obtained by the valve construction of Fig. 3, which is shown in connection with furnace flue terminals 7, 7' and an intermediate gas or air channel 10, having the same arrangement as the corresponding flues and channel of Fig. 2. In this case, the stationary hood or casing 19, common to both flue terminals 7 and 7', is open at its top to a stack connection 20 and provides interiorly a suitable seating surface 21 for a sliding D-shaped valve 22, adapted to be moved by any suitable means such as a hydraulic cylinder and piston 23. In the illustrated position of valve 22, said valve connects the air or gas supply channel with the flue terminals 7', while at the same time affording free passage to combustion products from channel 7, always in an upward direction, through the hood 19 to stack connection 20; when the valve 22 is shifted to the left, the entering gas or air is directed into flue terminal 7 and the waste products of combustion leave by way of flue terminal 7', hood 19 and stack connection 20.

Figure 4:
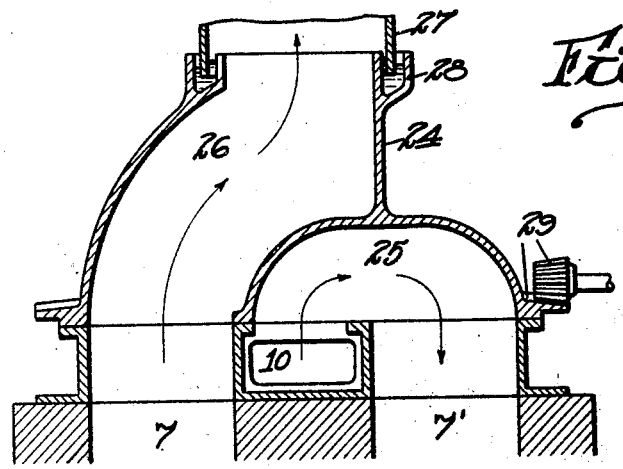

In the modified construction shown in Fig. 4, with the same arrangement of flue terminals 7, 7' and gas or air supply channel 10, provision is made for rotation of a valve member 24, the same having one passage or depression 25 in constant communication with the channel 10 and an independent passage 26 opening upwardly and in constant communication with a stack connection 27, the latter being preferably immersed in a water seal 28 carried by said valve member 24. In one position of said valve member as shown, the recess 25 serves for the delivery of air or gas from channel 10 to the flue terminal 7', with the products of combustion from flue terminal 7 passing in an upward direction through passage 26 and stack connection 27. When the valve member 24 is swung into its other position, by rotation imparted for instance through gearing 29, the recess 25 connects channel 10 to flue terminal 7, and the passage 26 connects flue terminal 7' to the stack connection 27.

Figure 5:
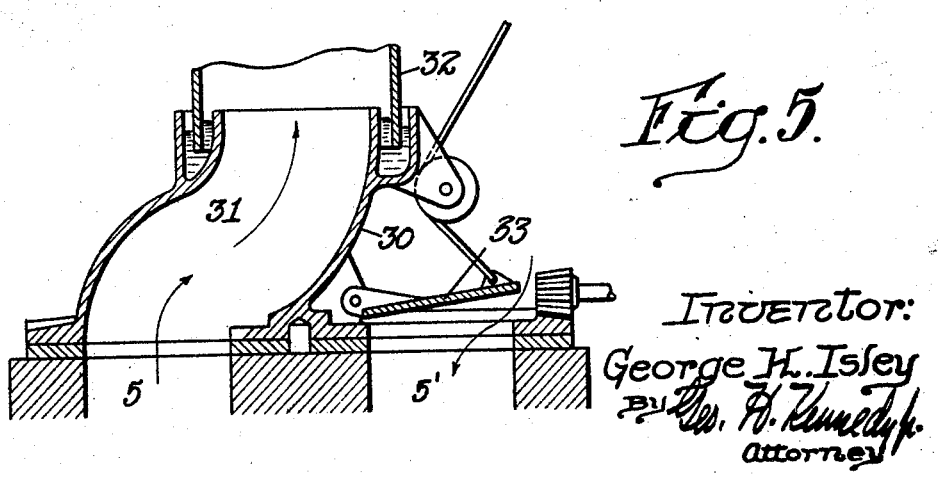

The construction shown in Fig. 5 is applicable only to the air flue terminals 5, 5' of the furnace, involving as it does the elimination of the intermediate supply channel 10. In this construction, a rotary valve member 30 provides a single passage 31, which is open at the top for a constant water seal communication with a stack connection 32. At its other end said passage 31 is registerable selectively either with the flue terminal 5 or the flue terminal 5'. In the position illustrated, air is drawn in through terminal 5' past an adjustable damper 33 which is carried by a valve member 30, and the products of combustion through flue terminal 5 pass upwardly to the stack connection 32 through passage 31. When the valve member 30 is rotated into its other position, the air damper 33 overlies flue terminal 5, and the passage 31 establishes communication between the flue terminal 5' and the stack connection 32.

I claim,

1. In apparatus of the class described, the combination with an overhead stack connection, a gas or air supply conduit and two underground furnace flues having ground level terminals, of valve means for selectively communicating either of said terminals with said stack connection and the other with said supply conduit, the latter being disposed above the ground level, thereby permitting said terminals to be closer together.

2. In apparatus of the class described, the combination with an overhead stack connection, a gas or air supply conduit and two underground furnace flues having ground level terminals, of a valve casing whose interior is common to all of said elements, and a swinging valve in said casing, mounted eccentrically, with its larger portion controlling the two flue terminals and its smaller portion controlling the supply conduit, thereby permitting the latter to be disposed above the ground level.

Dated this fourth day of May, 1923.

GEORGE H. ISLEY.